United States Patent [19]
Day

[11] Patent Number: 5,233,159
[45] Date of Patent: Aug. 3, 1993

[54] DIRECT CURRENT WELDING SYSTEM

[75] Inventor: Roger P. Day, 224 Clear Lake Rd., Clear Lake Shores, Tex. 77565

[73] Assignee: Roger P. Day, Kemah, Tex.

[21] Appl. No.: 903,498

[22] Filed: Jun. 24, 1992

[51] Int. Cl.⁵ .............................................. B23K 9/10
[52] U.S. Cl. .................. 219/137 PS; 219/74; 219/130.1; 219/132
[58] Field of Search ............... 219/130.1, 130.4, 132, 219/137 PS, 74; 338/214

[56] References Cited

U.S. PATENT DOCUMENTS

| | | | |
|---|---|---|---|
| 2,441,406 | 5/1948 | Freeman et al. | 219/130.1 |
| 3,177,338 | 4/1965 | Hoffmann | 219/130.1 |
| 3,278,721 | 10/1966 | Roe | 219/130.1 |
| 3,296,413 | 1/1967 | Steinert | 219/130.1 |
| 3,301,996 | 1/1967 | Bidwell | 219/130.4 |
| 3,449,543 | 6/1969 | Sciaky | 219/131 |
| 3,483,354 | 12/1969 | Manz et al. | 219/137 |
| 3,621,177 | 11/1971 | McPherson et al. | 219/61 |
| 3,652,824 | 3/1972 | Okada | 219/131 |
| 3,718,840 | 2/1973 | Tanaka et al. | 338/214 |
| 3,864,542 | 2/1975 | Fletcher et al. | 219/137 |
| 3,919,576 | 11/1975 | Reinbeck et al. | 310/207 |
| 3,932,728 | 1/1976 | Maxwell | 219/131 |
| 4,037,077 | 7/1977 | Harder | 219/123 |
| 4,177,551 | 12/1979 | Johnson et al. | 29/623.1 |
| 4,196,840 | 4/1980 | McClure | 228/212 |
| 4,227,066 | 10/1980 | Bulwidas, Jr. | 219/132 |
| 4,246,465 | 1/1981 | Ericsson | 219/130.51 |
| 4,251,710 | 2/1981 | Ortega-Aguirre et al. | 219/130.1 |
| 4,366,362 | 12/1982 | Ohta et al. | 219/123 |
| 4,431,902 | 2/1984 | Wallen | 219/125.12 |
| 4,459,460 | 7/1984 | Ogilvie et al. | 219/130.51 |
| 4,547,654 | 10/1985 | Stol | 219/137 |
| 4,590,357 | 5/1986 | Winkler | 219/130.1 |
| 4,628,427 | 12/1986 | Marvakov et al. | 363/27 |
| 4,705,934 | 11/1987 | Winkler | 219/137 |
| 4,788,412 | 11/1988 | Hori et al. | 219/137 |
| 4,801,780 | 1/1989 | Hayes | 219/130.1 |
| 4,861,965 | 8/1989 | Stava | 219/130.51 |
| 4,904,841 | 2/1990 | English | 219/133 |
| 4,909,807 | 3/1990 | Klink et al. | 29/623.2 |
| 4,947,021 | 8/1990 | Stava | 219/130.51 |
| 5,086,208 | 2/1992 | Habermann | 219/130.1 |

FOREIGN PATENT DOCUMENTS

| | | | |
|---|---|---|---|
| 120414 | 10/1945 | Australia | 219/130.1 |
| 162031 | 9/1954 | Australia | 219/130.1 |

Primary Examiner—Clifford C. Shaw
Attorney, Agent, or Firm—Arnold, White & Durkee

[57] ABSTRACT

A battery-powered welder delivers limited DC current to a workpiece without substantial reduction in applied voltage. The DC current is limited by utilizing a tungsten member in series between the battery and an arcing electrode. There is specifically disclosed a TIG welder embodiment.

19 Claims, 4 Drawing Sheets

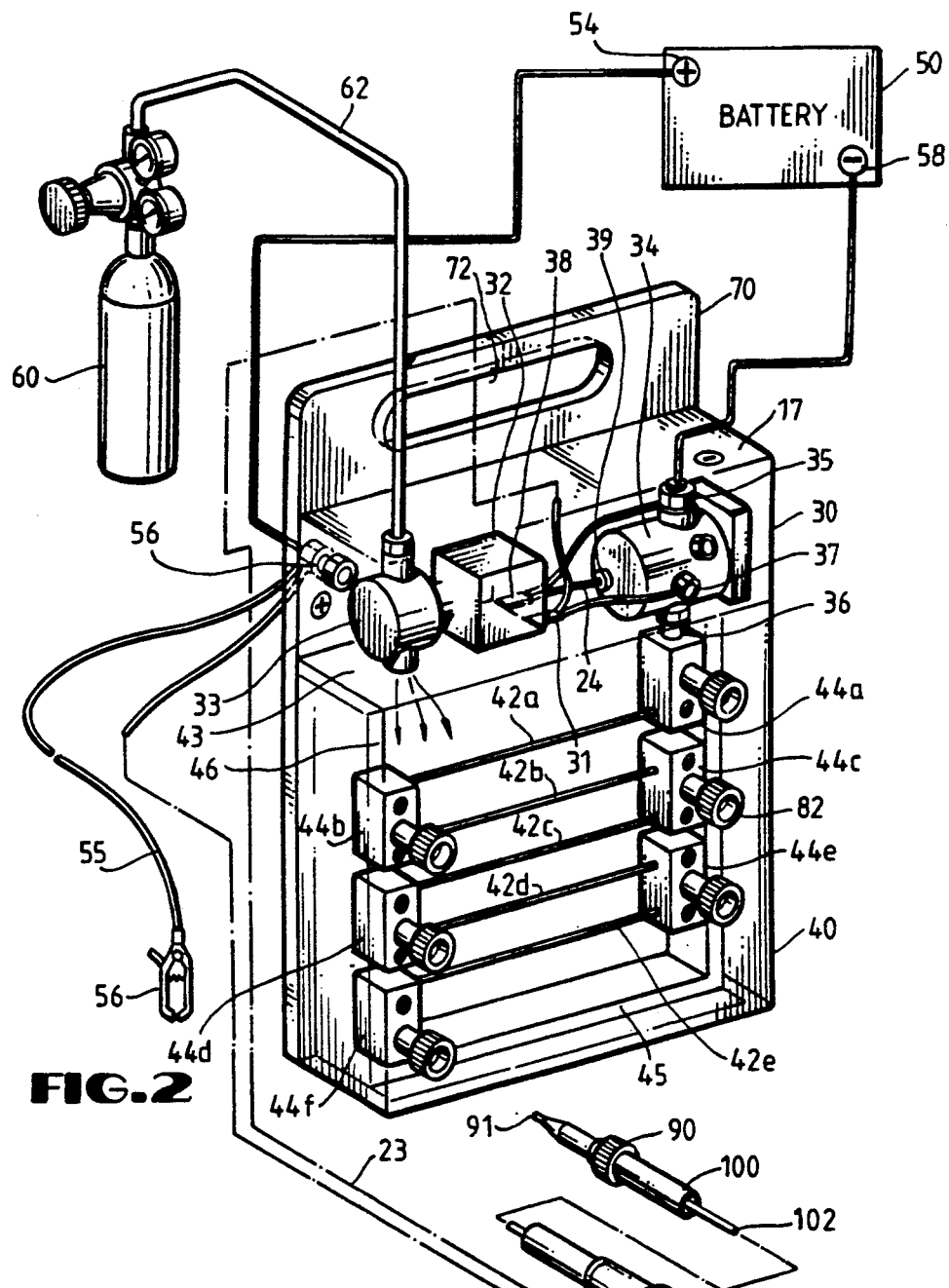
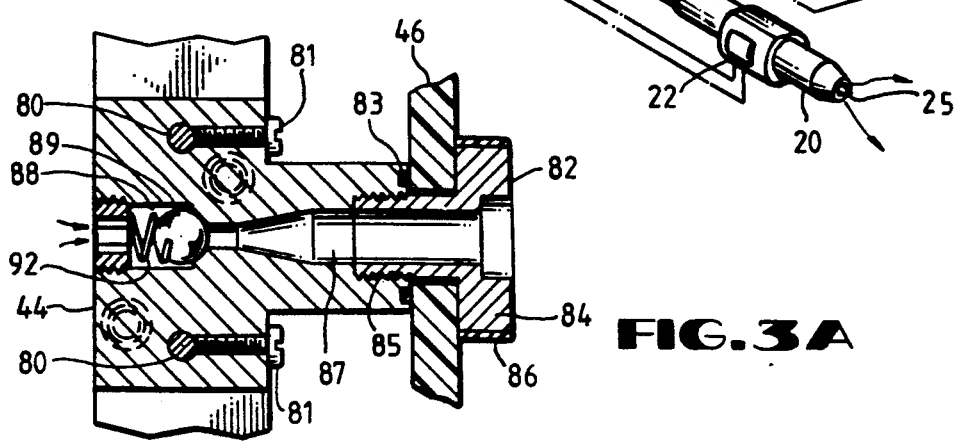

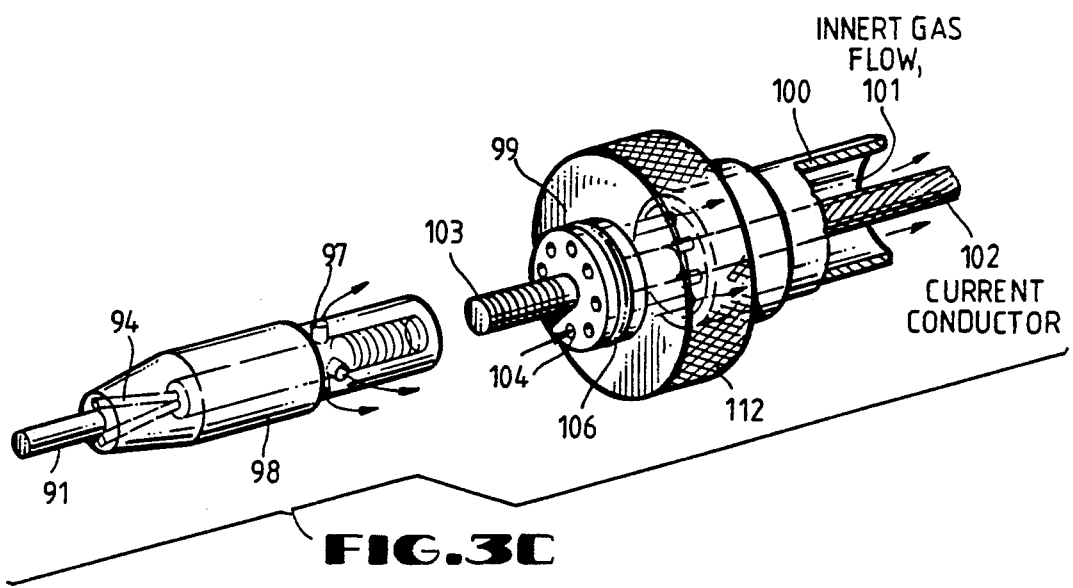
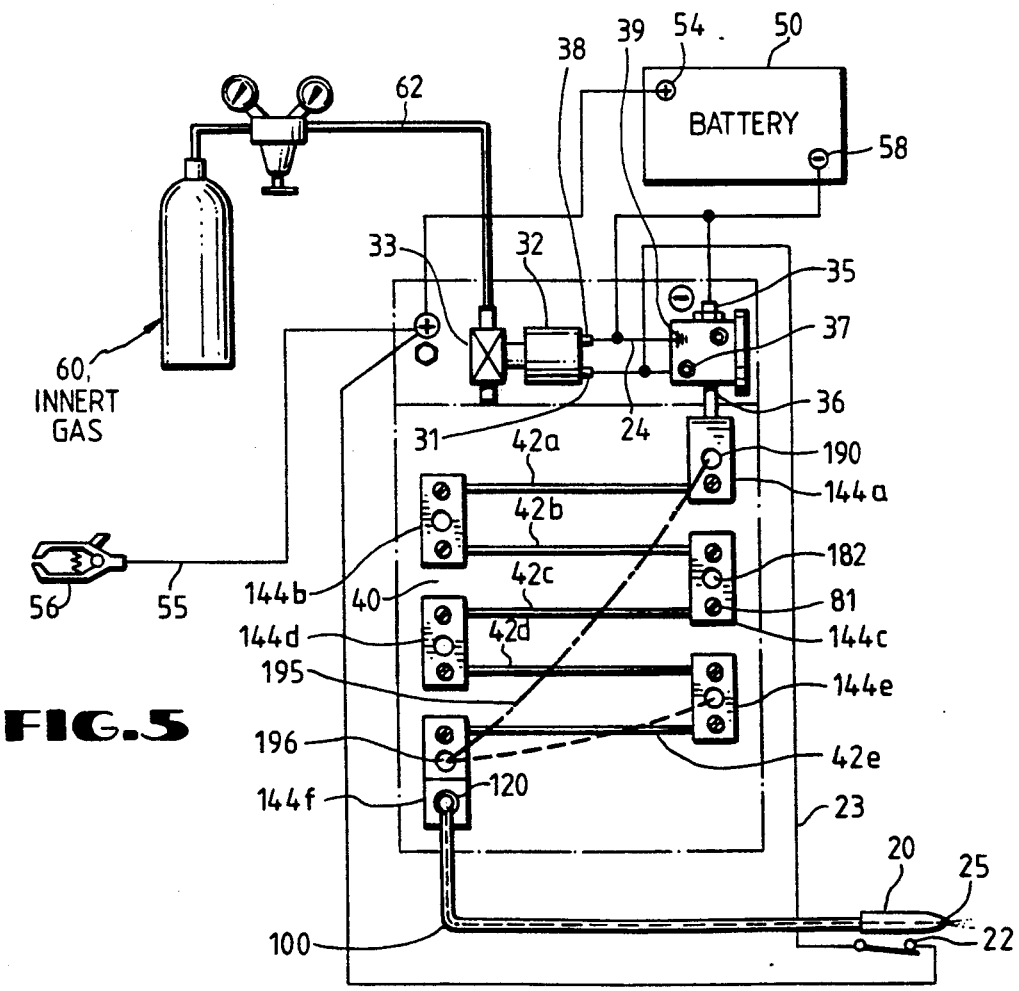

DIRECT CURRENT WELDING SYSTEM

BACKGROUND OF THE INVENTION

The present invention relates generally to welding systems, and more particularly relates to tungsten inert gas (TIG) welding systems. Current control for electrical welding such as TIG, metallic inert gas (MIG), or ordinary stick arc welders has been a fairly simple matter for designers historically since typically such systems operate on ordinary line AC current or DC current converted from AC current where any significant drops in voltage due to attempts to limit the current flow seldom reduce the line voltage below a level at which an arc would be produced. However, for portable welding devices which normally operate using a battery or series of batteries, current control has been difficult if not impossible. The designer has had two choices historically; 1) run the machine at full voltage, thus allowing the full amperage to be conducted to the workpiece, and running the risk that the arc will produce excessive heat and damage the workpiece; or 2) place a resistor or series of resistors between the current source and the workpiece, which, while limiting the current, also reduces the voltage, sometimes to levels below which an arc can be produced.

SUMMARY OF THE INVENTION

The present invention provides an electrical welding system wherein welding current through an arcing electrode is delivered to a workpiece without substantial reduction in the applied voltage, thus enabling the operator to selectively tailor the welding current to the size of the workpiece without loss of sufficient voltage to carry an arc. In accordance with the invention, a tungsten member is connected between a DC current source and the arcing electrode. The tungsten member may be one continuous piece or a plurality of segments connected in series. In the welding system of the present invention, welding current delivered to the workpiece is reduced in proportion to the length of the tungsten member. For example, in a particularly preferred embodiment, it has been found that for each 6 inches (approximately 0.1542 m) of length of 1/16 inch (approximately 0.001588 m) diameter tungsten rod, the current delivered to the workpiece is reduced by approximately 20 percent.

Further in accordance with the present invention, an opaque polycarbonate housing encloses a plurality of tungsten rods connected in series. The housing includes connection terminals adapted to electrically connect the rods between a DC battery, or plurality of interconnected DC batteries, and a TIG welding handpiece. A solenoid provides on-off switching of weld current through the tungsten rods. Another solenoid actuates a full-open, full-closed valve controlling flow within the housing of inert gas for the purposes of purging the housing of oxygen and cooling the rods during a welding operation. The operator controls both solenoids by a single switch in the welding handpiece.

The present invention has the advantage of providing a DC current welding system having welding current control without substantial voltage reduction. This advantage particularly provides for a DC inert gas welding system which is portable and quite suitable for use with a battery power source.

BRIEF DESCRIPTION OF THE DRAWINGS

FIG. 2 depicts an exterior view of an exemplary TIG welding system in accordance with the present invention.

FIG. 3A depicts an exemplary receptacle, illustrated in section.

FIG. 3C depicts the jumper of FIG. 3B, illustrated in an exploded and partially cut away view.

FIG. 5 depicts a schematic representation of an alternate embodiment of an exemplary TIG welding system in accordance with the present invention.

DESCRIPTION OF THE PREFERRED EMBODIMENTS

Figure 1:
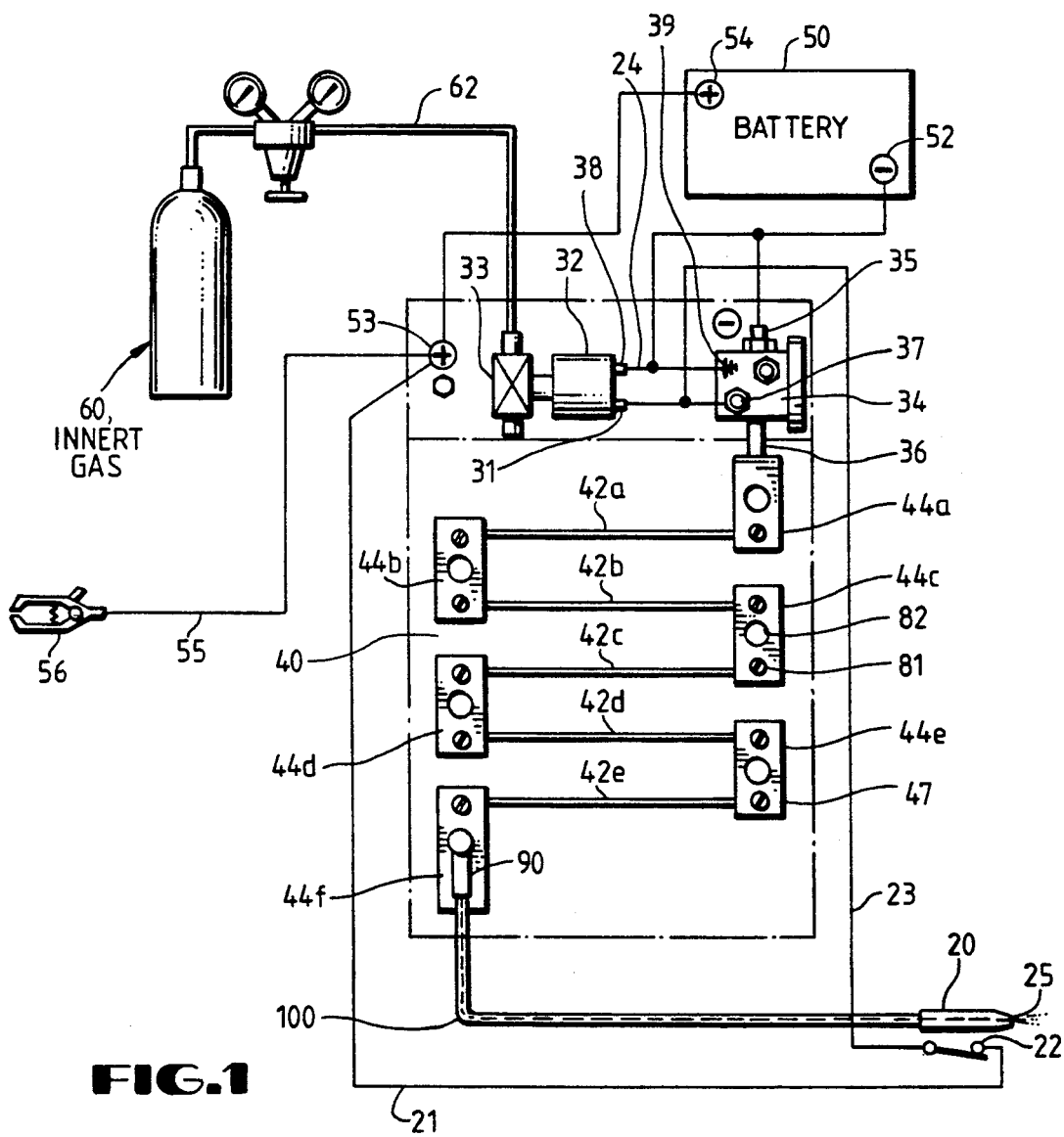
FIG. 1 depicts a schematic view of an exemplary TIG welding system in accordance with the present invention.

Referring to FIG. 1, there is shown a schematic diagram of a welding system in accordance with one particular implementation of the present invention. The welding system is battery-powered and uses inert gas shielding of an arcing electrode. A hand-piece 20 may be fashioned from an ordinary TIG welding handpiece modified to include a normally-open switch 22. The arcing electrode 25 in handpiece 20 delivers current to a workpiece. Inert gas from bottle 60 is carried through conduit 62 and ultimately delivered to handpiece 20 to provide a shield around the arcing electrode.

The battery-powered welding system is a positively-grounded system with the positive battery terminal 54 connected via terminal post 53 to a ground conductor 55 terminating with clamp 56. During a welding operation, clamp 56 is attached to the workpiece being welded.

The negative terminal 52 of battery 50 delivers welding current to arcing electrode 25 through a circuit path that includes solenoid 34 and a series connection to tungsten rods 42a–e. Solenoid 34 serves to provide an on-off switched power connection for weld current delivered to the workpiece. Solenoid 34 is in turn controlled by the operator-actuated switch 22. This switch is connected in a control circuit including wire 23 tapped from terminal 37 on solenoid 34 and conductor 21 connected to terminal 53.

The inert gas available from conduit 62 is controlled by valve 33. A solenoid 32 actuates gas valve 33 to regulate the flow of inert gas shielding arcing electrode 25. Solenoid 32 is connected in parallel with the tapped control circuit of solenoid 34. Accordingly, a connection is made between terminal 37 on solenoid 34 and terminal 31 on solenoid 32. Similarly, terminal 38 on solenoid 32 is connected to a circuit ground terminal 39 on solenoid 34 and to the negative terminal 52 of the battery. Consequently, when operator switch 22 is actuated, solenoid 32 in turn actuates gas valve 33 to initiate the flow of inert gas to the handpiece. As will be appreciated, upon actuation of switch 22, nearly simultaneous energizing of solenoids 32 and 34 occurs. This in turn results in near simultaneous actuation of gas valve 33 and a flow of inert shield gas along with connection of the battery to the tungsten rods which results in the striking of an arc and delivery of weld current to the workpiece.

As further shown in FIG. 1 and depicted in greater detail in FIG. 2, a housing 17 is provided to enclose tungsten rods 42. Housing 17 has an upper chamber 30 wherein solenoids 32 and 34 and gas valve 33 are mounted. The tungsten rods are mounted in a lower chamber 40 with each tungsten rod being supported at its ends by a respective pair of terminal blocks 44a–f. Gas valve 33 directs gas through chamber 40. Gas is obtained from chamber 40 via a combined gas coupling hose and electrical connection cable 100 attached to handpiece 20. A detachable or stab-in connector 90 at the end of gas conductor-cable 100 accesses a port formed in each of the mounting blocks 44 as is further described below.

In a particularly preferred embodiments, first solenoid 32 and gas control valve 33 may be acquired as a unit, such as an Eaton model 291-103 which is rated to deliver approximately 40 cubic feet per hour (approximately 1.133 m³/hour). Second solenoid is preferably a Borg-Warner model S-63. Both first and second solenoids 32, 34 should be rated for 12 or 24 volts DC.

Referring to FIG. 2, a handle 70 having a slot 72 extends upward from housing 17 to facilitate hand-carrying by the operator. Housing 17 is preferably fabricated from an opaque material such as polycarbonate but may also be fashioned from other types of transparent materials such as plexiglass.

Figure 3B:
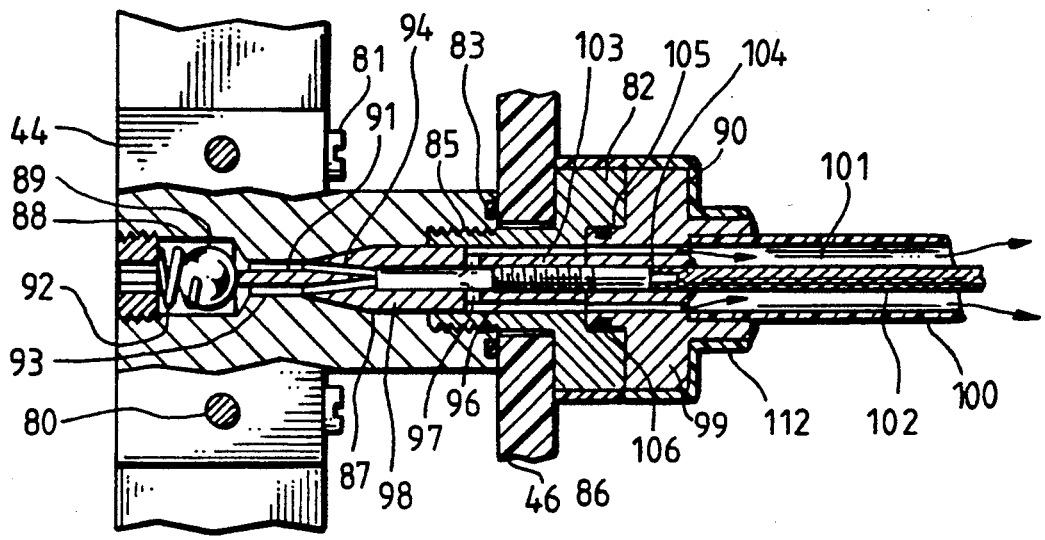
FIG. 3B depicts an exemplary receptacle and jumper, illustrated in section.
Figure 4:
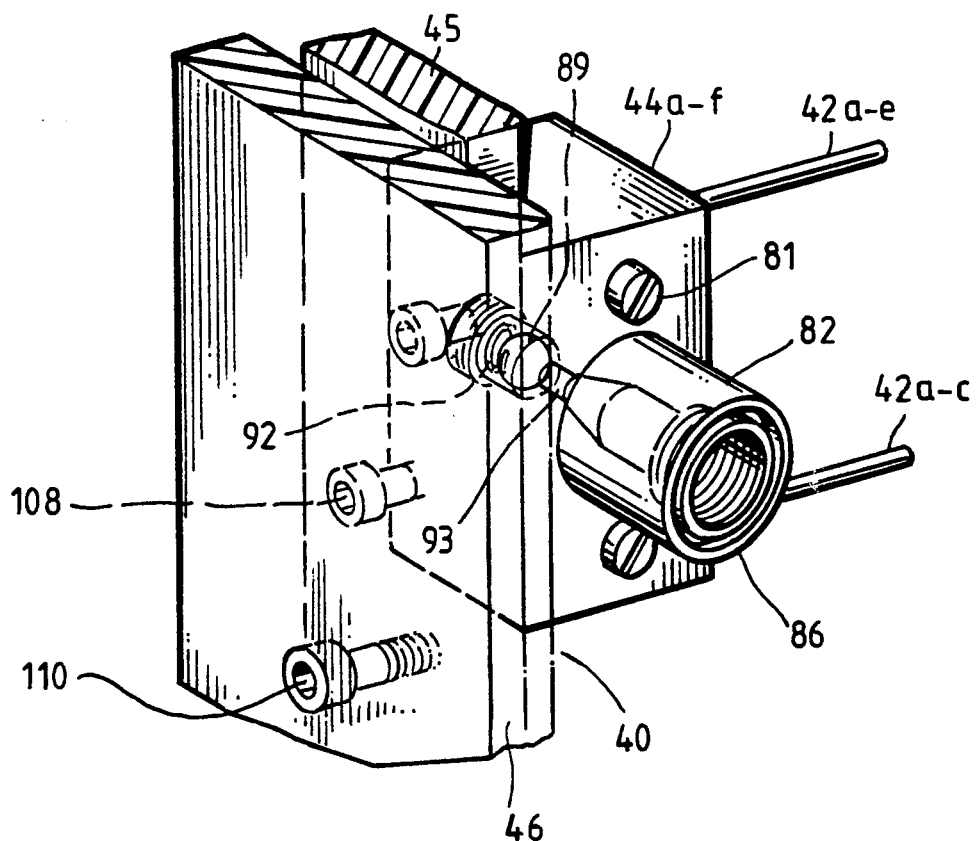
FIG. 4 depicts an exemplary block and portion of housing, illustrated in partial cut away.

Blocks 44a–f are fixed to internal framework 45 within lower housing 40 by screws 108, and internal framework 45 is fixed to lower chamber 40 by screws 110 as shown in FIG. 4. This arrangement avoids any external fixture such as threads or bolts which might pose an electrical shock hazard. Blocks 44a–f are spaced horizontally from one another a sufficient distance to permit the desired length of tungsten rod 42 to be placed therebetween, and spaced vertically a sufficient distance from one another to avoid the potential for arcing between adjacent blocks 44a–f. As shown in FIG. 3A, holes 80, which are sized slightly larger in diameter than tungsten rods 42a–e, permit rods 42a–e to slide into and be suspended by adjacent blocks 44a–f. Set screws 81 hold tungsten rods 45 in position within holes 80.

Blocks 44a–f are designed to enable the operator to select the length of tungsten rod 42 through which high amperage current flows to the handpiece 20 by use of a jumper 90 which may be inserted into a receptacle 82 in each block 44a–f as shown in FIG. 2. Referring to FIGS. 3A, 3B, and 4, receptacle 82 extends from 44a–f through exterior wall 46 of lower chamber 40. Each 44a–f is positioned flush with exterior wall 46, and end piece 84 of receptacle 82 is passed through exterior wall 46 and threadably connected to block 44a–f by way of threads 85. O-ring 83 provides a gas seal to prevent flow of inert gas from block 44a–f through exterior wall 46. Insulating coating 86 on receptacle 82 and insulating coating 112 on jumper 90 reduce the risk of electrical shock. Bore 87 allows insertion of jumper 90 into receptacle 82 and block 44a–f. Check valve 88 prevents discharge of inert gas outside of lower chamber 40 until jumper 90 is inserted into receptacle 82. Check valve 88 includes check ball 89 and check spring 92 which biases check ball 89 subject to the presence of jumper 90.

As shown in FIGS. 3B and 3C, when jumper 90 is inserted into receptacle 82, tip 91 protrudes into check valve 88, engaging check ball 89, and compressing check spring 92. If gas control valve 33 is in the open position, inert gas passes into lower chamber 40, through check valve 88, and into block annulus 93. Gas passes from block annulus 93 into jumper 90 via inlet passages 94 which are in fluid communication with annular space 96 by way of outlets 97. Gas then passes from annular space 96 into passages 104, then into annular space 101 of cable 100. When jumper 90 is removed from receptacle 82, tip 91 disengages check ball 89 and check spring 92 biases check ball 89 to close off check valve 88.

As shown in FIGS. 3B and 3C, jumper 90 is preferably composed of two pieces, taper 98 which includes inlet passages 94, tip 91, and outlets 97, and connector 99 which includes passages 104 and is preferably threadably connected to taper 98 by way of threads 103. Conducting wire 102 is preferably solder connected to connector 99.

Jumper 90 is preferably held in place by friction. In a particularly preferred embodiment, a standard Morse # zero taper in both receptacle 82 and taper 98, and proper sizing of the diameter of receptacle opening 105 provide a friction fit when jumper 90 is inserted in receptacle 82. O-ring 106 in jumper 90 provides a seal to restrain the flow of gas from block annulus 96 to the exterior of lower chamber 40 when jumper 90 is inserted into receptacle 82. Both blocks 44a–f and jumper 90 are preferably composed of a conducting material to allow current to flow from rods 42a–e to handpiece 20 by way of blocks 44a–f, jumper 90, and conducting wire 102.

The operator may select the magnitude of current that reaches the workpiece by placing jumper 90 in various receptacles 82 to vary the length of tungsten through which weld current flows. For example, in a particularly preferred embodiment shown in FIG. 2, five 6.0 inch (approximately 0.1524 m) long, 1/16 inch (approximately 0.001588 m) diameter tungsten rods 42a–e were connected in series by blocks 44a–f. Each rod 42a–e has the effect of reducing the current delivered approximately 20 percent. As an example, for a short circuit current of 400 amps from a 12 or 24 volt DC source, if the welding current is allowed to pass through one rod 42a, the welding current delivered to the workpiece will be reduced by approximately 20 percent (down to) 320 amps. Likewise, if jumper 90 is placed in receptacle 82 of block 44e, as shown in FIG. 2, welding current will flow through four rods 42a–d and thus will be reduced by approximately 80 percent down to a total of 80 amps. This approximately 80 percent reduction in current magnitude is accomplished without significant reduction in the voltage between the electrode and the workpiece. Thus heat control in a workpiece may be controlled with a depletable DC current source such as battery 50 without reducing line voltage to the point where arc is lost.

In another preferred embodiment shown FIG. 5, cable 100 is permanently coupled to block 144f. Inert gas passes from lower chamber 40 to handpiece 20 through orifice 120 which extends through block 144f and is in fluid communication with both lower chamber 40 and annular space 101 of cable 100. Conducting wire 102 is preferably solder connected to block 144f to enable DC current to pass from block 144f to conducting wire 102.

Current is again limited by the tungsten member through which weld current passes. In this embodiment, jumper 190 is electrically coupled to block 144f by cable 195 which is, in-turn, permanently fixed to block 144f at connection 196, preferably by soldering.

Jumper 190 is a conducting member fabricated with a tapered profile, such as, for example, a standard Morse # zero taper, and does not include any structure to convey inert gas. Receptacles 182 preferably have a standard Morse taper matching that of jumper 190 to provide a friction fit with jumper 190, and do not include structure to convey gas. As with the above described embodiment, the number of rods 42a–e through which DC current passes depends on which receptacle 182 jumper 190 is inserted into. For example, if jumper 190 is connected as shown in FIG. 5, rods 42a–e will be completely by-passed, and nearly the full discharge of DC current from battery 50 will flow through cable 195 to block 144f and handpiece 20 when normally open switch 22 is depressed.

Inert gas serves three functions in the welding system 10: first it provides some cooling for rods 42a–e within lower housing 40; second it purges lower chamber 40 of air which might oxidize rods during operation; and third it provides a non-oxidizing atmosphere for a workpiece as in an ordinary TIG device.

While the above discussion has focussed on TIG devices, it is anticipated that the invention may be used in DC operated metallic inert gas (MIG) applications as well.

Many modifications and variations may be made in the techniques and structures described and illustrated herein without departing from the spirit and scope of the present invention. For example, while the above disclosure refers to welding systems which utilize a handpiece 20, it is anticipated that the invention may be used in any DC welding application where an arcing electrode is employed, such as, for example, an automated welding system. An example of such an automated welding system might be a self-propelled welding system used to weld, for example, the seams between pipeline sections. Accordingly, the techniques and structures described and illustrated herein should be understood to be illustrative only and not limiting upon the scope of the present invention.

I claim:

1. A welding system comprising:
   a direct current source providing welding current and an applied voltage;
   an arcing electrode delivering welding current to a workpiece; and
   a tungsten member coupling the direct current source to the arcing electrode to limit the amount of welding current delivered to the workpiece without substantially reducing applied voltage.

2. The system of claim 1 wherein the direct current source is a battery.

3. The system of claim 1 further comprising an inert gas supply and a conduit delivering gas to form a shield for the arcing electrode.

4. The system of claim 1 further comprising a handpiece carrying the arcing electrode and including an operator-actuated switch for on-off control of weld current delivery to the workpiece.

5. The system of claim 1 wherein the tungsten member comprises a length of tungsten wire.

6. The system of claim 1 wherein the tungsten member comprises a length of rectangular tungsten rod.

7. The system of claim 1 wherein the tungsten member comprises a plurality of tungsten rods connected in series.

8. The system of claim 1 wherein the tungsten member comprises a plurality of tungsten rods connected in series, each rod having a cross-sectional area of approximately 0.003068 square inches.

9. The system of claim 8 wherein the rods have a total length of approximately 30 inches.

10. A tungsten inert gas welding system comprising:
    a direct current source providing welding current and an applied voltage;
    a tungsten member connected in series to the direct current source to limit the amount of the current delivered to workpiece without substantially reducing the voltage;
    a handpiece having an arcing electrode connectable to the tungsten member, and delivering welding current to a workpiece;
    said handpiece including an operator-actuated switch for on and off control of weld current delivery to the workpiece;
    an inert gas supply coupled to the handpiece and providing shield gas to an arc struck by the arcing electrode;
    a plurality of receptacles connected to the tungsten member at various locations along its length, the receptacles being adapted to provide electrical tap connections to establish a desired magnitude of welding current;
    a housing for enclosure of the tungsten member;
    a valve to control inert gas flow into the housing for cooling the tungsten member;
    a first solenoid actuating said gas valve between open and closed positions;
    a second solenoid interconnected between the direct current source and the length of tungsten; and
    an electrical connection of the operator-actuated switch to the first and second solenoids.

11. The system of claim 10 wherein the direct current source is a battery.

12. The system of claim 10 wherein the direct current source is a plurality of batteries.

13. The system of claim 10 wherein the length of tungsten comprises a length of tungsten wire.

14. The system of claim 10 wherein the length of tungsten comprises a length of rectangular tungsten rod.

15. The system of claim 10 wherein the length of tungsten comprises a plurality of tungsten rods connected in series and each receptacle tap connection is at a joinder node of adjacent rods.

16. The system of claim 15 wherein each rod has a cross-sectional area of approximately 0.003068 square inches.

17. The system of claim 16 wherein the rods have a total length of approximately 30 inches.

18. The system of claim 10 wherein each receptacle includes a check valve coupled to the supply of inert gas and yielding gas flow to the handpiece when a tap connection is made to the receptacle.

19. A method of welding a workpiece comprising the steps of:
    a. applying a direct current voltage to an arcing electrode;
    b. establishing an arc between the arcing electrode and a workpiece; and
    c. conducting welding current to the arcing electrode through a tungsten member that limits current delivered to the workpiece without substantial reduction in applied voltage.

* * * * *

UNITED STATES PATENT AND TRADEMARK OFFICE
CERTIFICATE OF CORRECTION

PATENT NO. : 5,233,159

DATED : AUGUST 3, 1993

INVENTOR(S) : ROGER P. DAY

It is certified that error appears in the above-identified patent and that said Letters Patent is hereby corrected as shown below:

In column 3, line 15, "embodiments" should read "embodiment".

In column 3, line 49, before "44a-f", please insert --block--.

In column 3, line 51, before "44a-f", please insert -- block--.

Signed and Sealed this

Eighth Day of March, 1994

*Attest:*

BRUCE LEHMAN

*Attesting Officer*   *Commissioner of Patents and Trademarks*